United States Patent

[11] 3,603,801

[72] Inventors: Thomas J. Harris
Poughkeepsie;
Kurt M. Kosanke, Wappingers Falls;
Werner W. Kulcke, Wappingers Falls;
Erhard Max, Wappingers Falls, all of, N.Y.
[21] Appl. No.: 839,750
[22] Filed: Apr. 16, 1969
Division of Ser. No. 356,442, Apr. 1, 1964,
Pat. No. 3,469,206.
[45] Patented: Sept. 7, 1971
[73] Assignee: International Business Machines Corporation
New York, N.Y.

[54] ELECTROOPTIC INFORMATION READ-OUT DEVICE USING POLARIZED LASER LIGHT
8 Claims, 7 Drawing Figs.
[52] U.S. Cl........................................ 250/225,
331/94.5, 340/174, 350/150, 350/151
[51] Int. Cl........................................ G02f 3/00
[50] Field of Search............................................ 350/150,
151, 160; 331/94.5; 250/225; 340/174

[56] References Cited
UNITED STATES PATENTS
3,496,483  2/1970  Max et al...................... 331/94.5

Primary Examiner—David Schonberg
Assistant Examiner—P. R. Miller
Attorneys—Joseph B. Taphorn, Ralph C. Dustin, John F. Hanifin and J. Jancin, Jr.

ABSTRACT: Information from a laser cavity having a magnetic storage member with different areas magnetized in different directions within the cavity producing different light polarizations is obtained by a polarization selection device including an analyzer and an electrooptic device which is operative in response to a scanning electron beam. The polarization selection device may include a pair of analyzers with their polarization directions orthogonal to one another and the electrooptic device positioned between the pair or a light deflecting device.

PATENTED SEP 7 1971

INVENTORS
THOMAS J. HARRIS
KURT M. KOSANKE
WERNER W. KULCKE
ERHARD MAX

*John F. Opterndorf*

ATTORNEY

PATENTED SEP 7 1971 3,603,801

ELECTROOPTIC INFORMATION READ-OUT DEVICE USING POLARIZED LASER LIGHT

This is a division of application Ser. No. 356,442, filed Apr. 1, 1964, now U.S. Pat. No. 3,469,206.

LASER STANDING WAVE MEMORY

This invention relates to mechanisms for conveying information by means of light obtained from a laser, and more particularly to mechanisms which are operable with a laser to produce light having characteristics representative of information and to read, print or display such information at a remote point.

There is described in a Pat. application Ser. No. 348,120 filed Feb. 28, 1964 by E. Max et al., now U.S. Pat. No. 3,496,483, a mechanism operating with a laser for effecting a polarizing of the light from the laser in either one direction or another by magneto-optic effects. The light is reflected from the surface of a magnetic material arranged in the laser cavity and magnetized in its surface in a direction parallel to the plane of incidence of the light acting upon it. This results in an elliptical polarizing of the light with the major axis of polarization in one direction or another at right angles to each other depending on the direction of magnetism. When the surface of the magnetic material has different areas magnetized in either one direction or another in accordance with binary information, light emanating from laser filaments corresponding to the areas become polarized in directions representative of the information.

By arranging an analyzer at the output side of the laser for blocking all light polarized in one direction and passing light polarized in another direction, it is possible to separate the light rays representative of one bit from those representative of another bit. If a second analyzer is now arranged to block all light passing the first analyzer, no information will be passed to a photodetector at the output side of the second analyzer until the polarization of the light passing the first analyzer has been changed so that it passes the second analyzer. Light rays from the first analyzer may be successively conditioned to pass the second analyzer by arranging between the analyzers an electro-optic device which normally passes the light rays without affecting their polarization. When an electron beam is directed against a spot on the electro-optic device to which light is passed from one of the laser filaments and it effects a rotation in the light polarization to a degree permitting it to pass the second analyzer, then light may act upon the photodetector to signify that a "one" bit was stored at the point corresponding to the laser filament. By moving the electron beam successively to spots on the electro-optic device corresponding to the different lasing filaments, light will be passed to the photodetector if there is light passing the first analyzer. When no light is detected, it may signify that a "zero" bit was read from memory. The significance of the information read may, of course, be reversed if desired.

Another readout system might comprise a digital light deflector like that described in a Pat. application Ser. No. 285,832, filed June 5, 1963 by T. J. Harris et al., now U.S. Pat. No. 3,499,700. This deflector may be operated to deflect light successively from the different lasing filaments, if the light is of the proper polarity, to a photodetector which recognizes them as representative of "one" bits stored in memory. Light rays of a different polarity would not be deflected to the photodetector and would be recognized as "zero" bits. For checking the information read, an electro-optic device may be arranged between the laser and the light deflector for rotating the polarization of the light rays so that one not normally deflected to the photodetector would be so deflected after rotation.

Instead of reading the bits of information successively, all of the information may be displayed simultaneously by projecting the light rays through an analyzer to a photoresponsive screen. The rays of one polarity will then show on the screen as bright areas while those of the other polarity will be represented as dark areas. These areas may be arranged in the form of a recognizable character which could be printed by directing the light against a photosensitive medium instead of a screen, if desired.

Instead of causing different filaments of the laser to emit light of one polarity or another in accordance with all of the binary bits stored, it is sufficient if the "one" bits cause their corresponding filaments to lase while those for the "zero" bits remain inactive. This, of course, may be reversed if desired. Such action may be obtained by placing in the laser cavity a quarter-wave plate and an electro-optic crystal activated by an electron beam. A laser filament corresponding to a spot activated by the electron beam operates to emit linearly polarized light while a filament for a spot not activated emits no light. Any of the proposed readout systems may then be employed for determining what information was stored.

If the laser operates to produce light linearly polarized in a given plane, then separate mirrors may be located at only those points where either "one" or "zero" bits are to be stored. These operate to cause lasing action in corresponding laser filaments while the filaments corresponding to the other points remain inactive.

An object of this invention is to provide systems in which different portions of light from a laser are polarized according to binary information and read out selectively to a point of use.

Another object is to provide a system in which different portions of light in a laser beam are polarized in accordance with binary information and displayed simultaneously on a viewing screen.

Still another object is to provide means for reading information from a laser light beam in which different areas of the beam are polarized in accordance with binary information.

Yet another object is to provide a laser having means associated therewith for polarizing different areas of the output light beam in accordance with binary information.

The foregoing and other objects, features and advantages of the invention will be apparent from the following more particular description of preferred embodiments of the invention as illustrated in the accompanying drawings.

Figure 1:
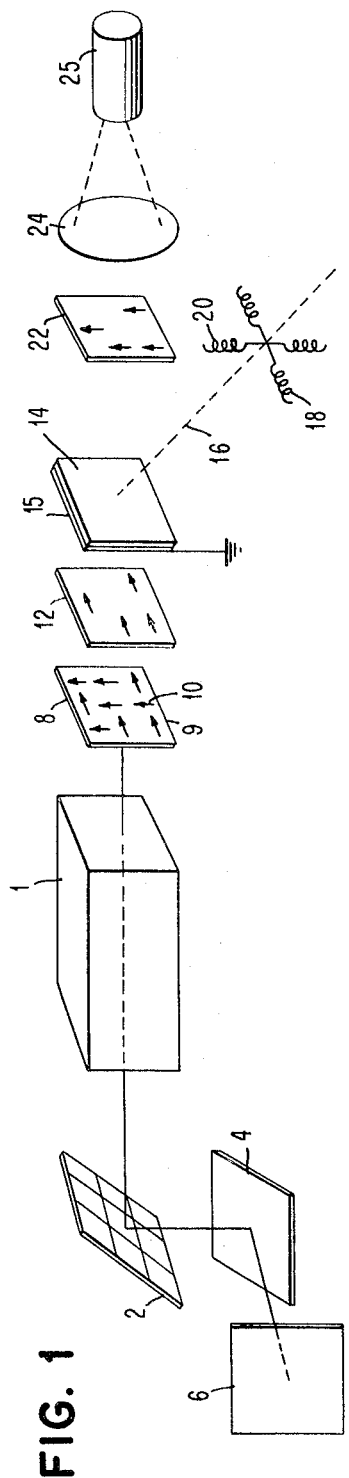
FIG. 1 is a schematic diagram of a system in which rays of light from a laser are polarized in accordance with binary information and then read out serially to a point of use.

Referring to FIG. 1 of the drawings, it will be noted that there is shown a laser including a negative temperature medium 1, such as a suitably excited, ruby rod, associated with mechanisms like those described in the Max et al. application mentioned above for producing light rays polarized in one direction or another in accordance with stored binary information. These mechanisms include a memory element 2 in the form of a plate of magnetic material having a highly reflective surface against which light is directed from one end of the medium 1. This surface is divided into areas which are magnetized in directions lying in the surface and parallel to the plane of incidence for the light acting upon it. The plate 2 is arranged at an angle to reflect light from the medium 1 to a compensating mirror 4 which, in turn, reflects light to a mirror 6. From the mirror 6, light is reflected back over the same path to the medium 1 by way of mirror 4 and plate 2. Mirror 4 is inserted to exclude a polarizing influence due to pure metallic reflection from the plate 2. At the other end of the medium 1 is a mirror 8 which reflects some of the light from the medium 1 back through the medium and permits the remainder of the light to pass through as an output beam. As the light is reflected from the surface of the plate 2 while passing between the mirrors 6 and 8, it becomes slightly polarized by magneto-optic effects in a direction depending on the direction in which the reflecting surface is magnetized. After the light passes a few times between the mirrors 6 and 8, it becomes fully polarized in one direction or another spaced apart by 90°.

Mirror 8 has marked upon it arrows 9 and 10 to designate rays of light polarized in one direction or another in accordance with bits of information represented by directions of magnetism on different areas of plate 2. Arranged adjacent the output side of mirror 8 is an analyzer 12 which is oriented so as to pass light polarized on the direction indicated by arrows 9 and to block light polarized in the direction indicated by arrows 10. Next to the analyzer 12 is an electro-optic device 14 having a transparent electrode 15 at one side connected to ground. Directed against the opposite side of the device 14 is an electron beam 16 which may be deflected to any point on the surface of the device 15 by horizontal and vertical deflecting means 18 and 20, respectively. The electro-optic device 14 is made of material, such as a properly oriented crystal of ammonium dihydrogen phosphate, which operates in the presence of an electric field parallel to a beam of polarized light for effecting a rotation in the polarization of the energizing beam.

At the side of the electro-optic device 14 opposite the analyzer 12 is a second analyzer 22 which is crossed with respect to the analyzer 12 so that light normally passing the latter is blocked. When the electron beam is directed to a spot on the device 14 to which light is passed from the analyzer 12, the polarization of the light is rotated so that it passes the analyzer 22. If the electron beam is directed to a spot which receives no light from the analyzer 12, there will, of course, be no light passed on to the analyzer 22. Any light passing the analyzer 22 is directed by a lens 24 to a photodetector 25. A reading of the information stored is accomplished by directing the electron beam to each spot on the device 14 corresponding to an area on the plate 2 at which a bit of information may be stored and then noting from the photodetector whether or not light was detected. An output by the photodetector may indicate the reading of a "one" bit while the absence of an output indicates a "zero" bit.

Figure 2:
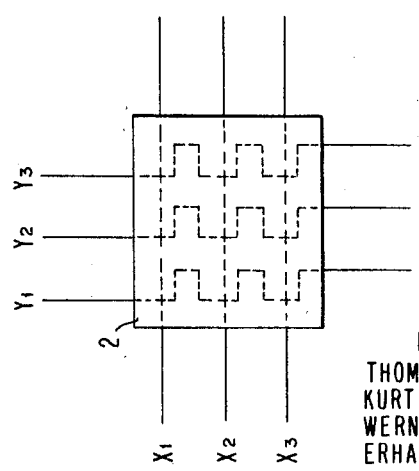
FIG. 2 shows means for writing information into a storage element in FIG. 1.

The information represented by directions of magnetism on different areas of a magnetic film or plate 2 may be changed at will by providing conductors X and Y, as shown in FIG. 2, which may be pulsed selectively by mechanisms described in a Pat. application, Ser. No. 815,016, filed May 22, 1959, now U.S. Pat. No. 3,130,390 by A. C. Moore et al. The magnetizing of any area is obtained only when the X and Y conductors through that area are pulsed simultaneously.

Figure 3:
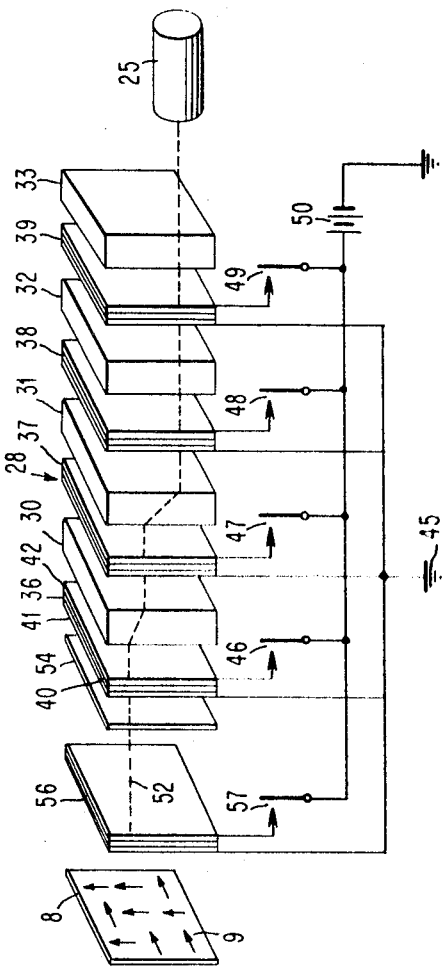
FIG. 3 shows a digital light deflector arranged to read the information represented by the polarity of the light rays at the output side of the laser in FIG. 1.

In another form of the invention shown in FIG. 3, a light deflection system, generally designated 28, like that described in the Harris et al. application mentioned above, is used for deflecting light from any selected point on the mirror 8 to the photodetector 25. The light deflection system comprises birefringent elements 30, 31, 32 and 33 which may be crystals cut specially to allow plane polarized light to pass through them in one path or another as either an ordinary ray or an extraordinary ray. The path followed depends upon the direction in which the beam entering the crystal is polarized. Light plane polarized perpendicular to the plane of the drawing will pass, for example, through the crystal without deflection as the ordinary ray if the crystal is properly oriented. If the light is polarized parallel to the plane of the drawing, it will be deflected in a crystal oriented in this same manner and pass as the extraordinary ray over a different path. When two crystals are arranged with their orientations at 90° to each other and in alignment so that a beam of light will pass through both, then a polarization of the light to effect its passage through the first crystal as an ordinary ray will result in its passage through the second crystal as the extraordinary ray. The spacing between the points at which the ordinary and extraordinary rays leave a crystal is directly proportional to the thickness of the crystal.

It is assumed in FIG. 3 that crystals 30 and 31 are so oriented that light polarized perpendicular to the plane of the drawing, as indicated by arrow 9, passes through them without deflection. When the polarization of this light is rotated 90°, it is deflected downwardly and passes through these crystals as an extraordinary ray. Crystals 32 and 33 are oriented at 90° to the crystals 30 and 31 so that light passing the latter crystals as an ordinary ray will be deflected forwardly in a horizontal direction by the crystals 32, 33 and pass through them as an extraordinary ray. At the input sides of the birefringent crystals are electro-optic devices 36, 37 38 and 39 which are selectively operable for rotating the polarization of the light 90° and thereby determining the path over which the light passes through crystals at its output side. Each of the electro-optic devices includes an electro-optic crystal 40 arranged between the transparent electrodes 41 and 42. When a potential of sufficient magnitude is applied across any one of the electro-optic devices, a rotation of the plane of polarization of the light by 90° takes place. For applying such a potential selectively across these devices, one electrode of each device is connected to ground at point 45 while the other electrodes are connected through switches 46, 47, 48 and 49 to one side of a potential source 50 which is connected to ground at its other side. Mechanical switches are shown herein only to provide an understanding of the invention. In actual practice, electronic switching means responsive to coded electric pulses would be used. The potential of the source 50 is of sufficient magnitude to effect a rotation of the plane of polarization of the light beam by 90° as it passes through one of the electro-optic devices having the potential applied across it by closing one of the switches.

As indicated by arrows on the mirror 8 of FIG. 3, there are nine areas of light polarized in different directions in accordance with binary information on plate 2 of FIG. 1. There could be either more or less than this number of areas, and the nine indicated only serve as an example. It will be noted that these rays are on three different levels and in three different vertical rows. The photodetector 25 is shown located at a point opposite the front vertical row at the lowest level. For areas in the middle and top levels to reach the detector 25, they must be deflected downwardly one and two units respectively. Rays in the middle and back rows must be deflected forwardly one and two units respectively. To accomplish such deflections, crystals 30 and 31 must be capable of deflecting light one unit distance each while crystals 32 and 33 deflect the light forwardly one unit distance each. If it becomes necessary to deflect the light a large number of unit distances, the crystals may be varied in thickness in accordance with binary values.

With polarization in the directions indicated on the mirror 8 and the switches 46, 47, 48 and 49 open, the light ray at the upper left corner of the mirror will follow the path of the broken line 52, being deflected downwardly one unit in each of crystals 30 and 31 and passing straight through crystals 32 and 33 to the detector 25. If nothing more than what has been described was provided, the area in the lower right corner would also reach the detector 25 since it is polarized in a plane to pass straight through crystals 30, 31 and then be deflected forwardly by crystals 32 and 33. To limit the selection to only one area for any setting of the switches, an analyzer 54 is arranged at the input side of the electro-optic device 36. This analyzer may be oriented to pass light polarized in either the horizontal or vertical plane while blocking light polarized in the other plane. Assuming that it passes light polarized in the vertical plane, then the ray at the upper left corner of the mirror 8 will still pass through to the photodetector 25 but the ray at the lower right corner is blocked by the analyzer. All of the other rays polarized in the vertical plane will reach the detector 25 only when one or more of the switches are closed. Considering the ray in the upper right corner, it will be noted that it s deflected to the lower level by crystals 30 and 31 but then must be deflected forwardly two units and this is accomplished only by closing switch 48 to rotate the polarization of this ray 90° so that it is deflected by the crystals 32 and 33. To read out all of the information stored, the switches are operated to effect a deflection of light from different areas of the mirror 8 according to a predetermined order. If an output from the detector 25 is noted for any switch setting, then it is known that a "one" bit is stored at the area corresponding to the setting. If no output is received from the detector 25 for some switch setting, then it is known that a "zero" is stored at the corresponding area. For checking the reading of information from the different areas, an electro-optic device 56 is arranged between the analyzer 54 and the mirror 8. This device is energized by the closing of a switch 57 to effect a rotation of the polarization of the rays from the mirror 8 by 90°. When rotated in this manner, the readings from the detector 25 for different switch settings should be opposite those obtained before rotation.

Figure 4:
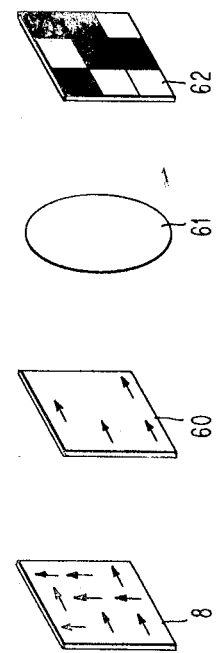
FIG. 4 shows means for displaying the information obtained from the laser of FIG. 1.

FIG. 4 shows an analyzer 60 at the output side of the mirror 8 for blocking light polarized in a vertical plane and passing light polarized in a horizontal plane through a lens 61 to a light responsive screen 62. It is seen that the light and dark areas on the screen provide a visual indication of the information stored. This information could be in the form of some character, if desired.

Figure 5:
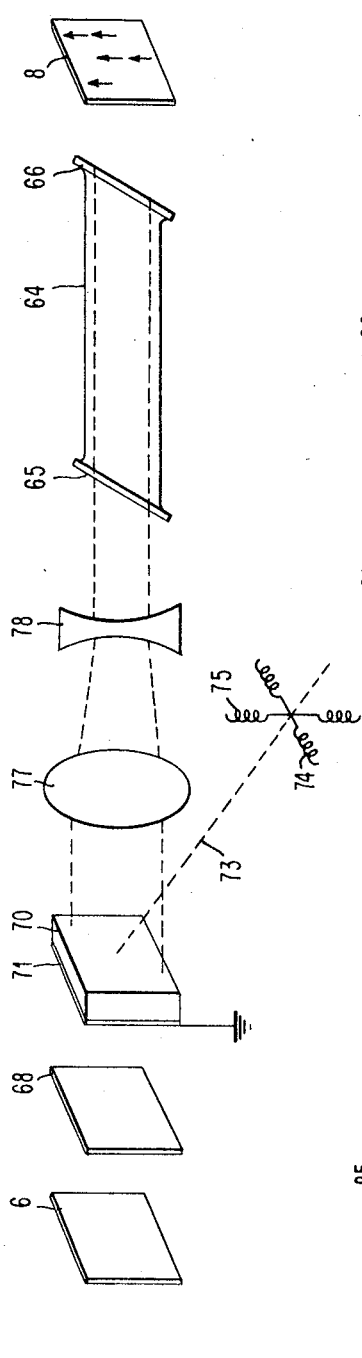
FIG. 5 is a schematic diagram of a laser having means associated therewith for causing a lasing action by filaments corresponding to predetermined bits of binary information.

There is shown in FIG. 5 an arrangement in which a negative temperature medium 64 of a laser is so oriented that its output is plane polarized. At the ends of the medium 64 are Brewster windows 65 and 66 which allow only one component of light to pass into and out of the medium 64 without loss. The partially reflecting mirror 8 is arranged adjacent one end of the medium as in FIG. 1, and the full reflecting mirror 6 is arranged at the opposite end of the medium in axial alignment therewith. Between the mirror 6 and the medium 64 is a phase plate 68 and an electro-optic device 70 having a transparent electrode 71 at one side connected to ground, Acting upon the other side of the device 70 is an electron beam 73 which may be deflected to any point on the surface of the device 70 by horizontal and vertical deflecting mans 74 and 75, respectively. Light normally passes through the device 70 without any change in its polarization. When the electron beam is directed against some spot on the device 70, the electric field produced at that spot results in an additional phase shift, such that the sum of the phase shifts after two passes through mediums 70 and 68 results in a net rotation of polarization of zero degrees. Between the device 70 and the Brewster window 65 are lenses 77 and 78 for focusing the light to pass within the desired limits of the operating mechanisms.

Let us consider now a simple case where the phase plate 68 is a quarter-wave plate. Assuming that the light passing through the medium 64 and the Brewster windows 65, 66 without loss is linearly polarized in a vertical direction. If the electron beam 73 is turned off, then the light passes through the electro-optic device 70 without any change in its polarization. As the light passes through the quarter-wave plate 68, however, it becomes circularly polarized. The light is then reflected by the mirror 6 back through the plate 68 and becomes linearly polarized in a horizontal direction. When this light engages the window 65, it is reflected from the surface so that insufficient light passes through the medium to effect a lasing action. If the electron beam is now directed to some point on the surface of the device 70, light passing through that point from the medium 64 becomes circularly polarized. As it passes the quarter-wave plate 68 it becomes linearly polarized. After reflection from the mirror 6, the light again passes through the plate 68 and the device 70 so that it reaches the window 65 linearly polarized in a vertical plane. This portion of the light now passes through the laser filament from which it originated and effects a lasing action within this portion of the medium. The electron beam may be directed to different points serially at which it is desired to establish light rays representative of bits of information. After the electron beam has been moved from any point, the electric charge at that point gradually disappears but still remains sufficient to perform its function until the beam can be directed to the point again for renewing the charge. All areas on the mirror 8 at which no light appears are then representative of bits of information opposite those at which light is detected. Mirror 8 has arrows marked upon it to indicate locations at which light rays appear when it operates to transmit information like that of FIG. 1. This information may be read by apparatus like that of FIG. 1 except that the analyzer 12 would not be needed and the analyzer 22 would be oriented to pass only light linearly polarized in the horizontal direction. The light deflector 28 of FIG. 3 could also be used to read the information from the system of FIG. 5 but the electro-optic device 56 and the analyzer 54 would not be needed.

Figure 6:
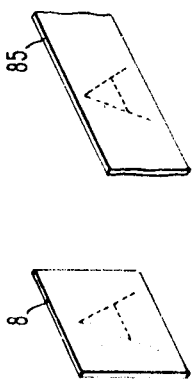
FIG. 6 shows the output mirror of FIG. 5 with the light from the laser in the configuration of a character and projected onto a light sensitive medium.

In another application of this invention, the electron beam 73 might be moved to trace a character so that the light appearing at the output mirror 8 would be in the form of the character as indicated by FIG. 6. Light in this character shape may then be directed from the mirror 8 to either a light sensitive film 85 for effecting a printing of the information or to a viewing screen as shown in FIG. 4, any suitable means, not shown, could be employed for moving the film 85 while the information was changed by moving the electron beam.

Figure 7:
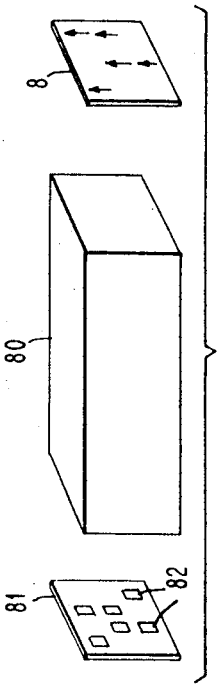
FIG. 7 is a schematic diagram of mechanisms associated with a laser for effecting a lasing action by its filaments corresponding to predetermined bits of binary information.

Another system for producing light rays at predetermined points while no light is produced at other points may be like that shown in FIG. 7. This includes a laser medium 80 having the partially reflecting mirror 8 at one end and a nonreflecting plate 81 at its other end. Mounted on the plate 81 are small mirrors 82 at points where it is desired to store information representative of "one" bits. These mirrors reflect light through corresponding filaments in the medium 80 and effect a lasing action. No light is reflected through the other filaments and so there is no lasing action in them to produce light. Information represented by the arrangement of mirrors 82 on the plate 81 may be read by detecting the presence or absence of light from different areas of the mirror 8 in the same manner as in FIG. 5.

While the invention has been particularly shown and described with reference to preferred embodiments thereof, it will be understood by those skilled in the art that the foregoing and other changes in form and details may be made without departing from the spirit and scope of the invention.

What is claimed is:

1. A mechanism for conveying information by means of light obtained from a laser comprising, in combination:

a negative temperature medium which is operable when activated to emit coherent light, said light acting when directed back through said medium to effect a lasing action within different filaments of said medium, a partially reflecting mirror at one end of said medium for returning part of the light to said medium and passing the remainder of the light as an output beam, means at the other end of said medium for acting upon selected portions of the emitted light to effect its return through filaments from which it was emitted and maintain lasing action within them, the portions of light returned through said filaments being selected to represent information to be conveyed, and means including a light responsive device arranged in the path of said output beam to provide an indication of the information transmitted, wherein said last-mentioned means includes means arranged between said light responsive device and said partially reflecting mirror for scanning areas on the latter corresponding to laser filaments from which light may be obtained, said scanning means operating when detecting light from any of said filaments to pass such light to said light responsive device.

2. A mechanism for conveying information by means of light obtained from a laser comprising, in combination:

a negative temperature medium which is operable when activated to emit coherent light, said light acting when directed back through said medium to effect a lasing action within different filaments of said medium, a partially reflecting mirror at one end of said medium for returning part of the light to said medium and passing the remainder of the light as an output beam, means at the other end of said medium for acting upon selected portions of the emitted light to effect its return through filaments from which it was emitted and maintain lasing action within them, the portions of light returned through said filaments being selected to represent information to be conveyed, and means including a light responsive device arranged in the path of said output beam to provide an indication of the information transmitted, wherein the laser is constructed so as to emit linearly polarized light from any of its filaments in which lasing action takes place, and means arranged between said partially reflecting mirror and said light responsive device for normally blocking the flow of light to the latter but being operable to pass light selectively from different filaments if lasing action is taking place within them, said last-mentioned means including an analyzer which blocks the flow of light from said laser, an electro-optic device arranged between said partially reflecting mirror and said analyzer, and means for directing an electron beam to selected points on said electro-optic device for rotating the polarization of light received at such point from said laser to effect its passage through said analyzer to said light responsive device.

3. A mechanism for conveying information through a light beam from a laser to a point of use comprising, in combination:

a magnetic member having different areas magnetized in one direction or another in accordance with binary information, said member arranged in the cavity of said laser so as to reflect light from said areas and effect a polarization of light from laser filaments corresponding to said areas in one direction or another depending on the direction of magnetization, a light responsive device, and means for passing light to said device from different laser filaments selectively when the light therefrom is polarized in a predetermined direction.

4. The mechanism of claim 3 including means for magnetizing the different areas on said magnetic member in one direction or another selectively.

5. The mechanism of claim 3 in which said last-mentioned means includes a pair of analyzers which are normally operative to block the passage of light to said light responsive device, and an electro-optic device associated with said analyzers and operable to change the polarization of any portion of the light which may pass one of said analyzers so that it passes the other of said analyzers to said light responsive device.

6. The mechanism of claim 3 in which said last-mentioned means includes a pair of analyzers arranged in the path of a light beam between said laser and said light responsive device, one of said analyzers being oriented to pass light polarized in one direction and the other being oriented to pass light polarized in a different direction, and an electro-optic device arranged between said analyzers and operable to change the polarization of light passing one of said analyzers from any selected filament so that it also passes the other of said analyzers to said light responsive device.

7. The mechanism of claim 3 in which said last-mentioned means includes a light deflector arranged between said light responsive device and said laser, said deflector being operable to deflect light of a selected polarity from any laser filament to said light responsive device.

8. The mechanism of claim 3 in which said last-mentioned means includes a light deflector arranged between said light responsive device and said laser, said deflector including a plurality of birefringent crystals, an electro-optic device arranged at the input side of each of said crystals, said electro-optic devices normally passing light without changing its polarization, and means for applying voltage pulses to said electro-optic devices selectively whereby the polarization of the light passing therethrough is rotated 90°.